United States Patent
Newell (10) Patent No.: US 8,245,806 B2
(45) Date of Patent: Aug. 21, 2012

(54) RIDING MOWER WITH A SUSPENSION COMPONENT COUPLED TO A PLURALITY OF USER SUPPORT COMPONENTS AND METHODS OF MAKING AND USING THEREOF

(76) Inventor: Nick Newell, Hays, KS (US)

(*) Notice: Subject to any disclaimer, the term of this patent is extended or adjusted under 35 U.S.C. 154(b) by 298 days.

(21) Appl. No.: 12/642,781

(22) Filed: Dec. 19, 2009

(65) Prior Publication Data

US 2010/0154373 A1 Jun. 24, 2010

Related U.S. Application Data

(60) Provisional application No. 61/139,554, filed on Dec. 20, 2008.

(51) Int. Cl.
*B62D 33/067* (2006.01)
(52) U.S. Cl. .............. 180/89.18; 180/89.17; 280/124.1
(58) Field of Classification Search .......... 180/89.17, 180/89.18; 280/124.1; 297/440.15; 56/14.7
See application file for complete search history.

(56) References Cited

U.S. PATENT DOCUMENTS

| | | | | |
|---|---|---|---|---|
| 3,774,711 A * | 11/1973 | Lacey | ............. | 180/329 |
| 4,311,204 A * | 1/1982 | Shupert | ............. | 180/54.1 |
| 5,367,864 A * | 11/1994 | Ogasawara et al. | ............. | 56/15.8 |
| 5,842,707 A * | 12/1998 | Smith | ............. | 280/32.7 |
| 5,873,224 A * | 2/1999 | Murakawa et al. | ............. | 56/11.4 |
| 6,560,952 B2 * | 5/2003 | Velke et al. | ............. | 56/14.7 |
| 7,162,816 B2 * | 1/2007 | Otsuka et al. | ............. | 37/347 |
| 7,882,914 B2 * | 2/2011 | Scheele et al. | ............. | 180/89.14 |
| 8,038,379 B2 * | 10/2011 | Yamashita et al. | ............. | 414/680 |
| 2001/0001170 A1 * | 5/2001 | Velke et al. | ............. | 56/14.7 |
| 2002/0162314 A1 * | 11/2002 | Velke et al. | ............. | 56/14.7 |
| 2002/0174637 A1 * | 11/2002 | Velke et al. | ............. | 56/14.7 |
| 2004/0244348 A1 * | 12/2004 | Ferris | ............. | 56/15.8 |
| 2007/0169455 A1 * | 7/2007 | Umemoto et al. | ............. | 56/14.7 |
| 2009/0308039 A1 * | 12/2009 | Marshall et al. | ............. | 56/14.7 |
| 2010/0154373 A1 * | 6/2010 | Newell | ............. | 56/14.7 |
| 2011/0185692 A1 * | 8/2011 | Marshall et al. | ............. | 56/14.7 |
| 2011/0277433 A1 * | 11/2011 | Sugden et al. | ............. | 56/10.1 |

* cited by examiner

*Primary Examiner* — Ruth Ilan
*Assistant Examiner* — Karen A Beck
(74) *Attorney, Agent, or Firm* — Kilpatrick Townsend & Stockton LLP (57) ABSTRACT

In some embodiments, systems and methods provided herein relate to a riding mower including a plurality of user support components coupled to a main frame and a suspension component coupled to the plurality of user support components such that movement of the plurality of user support component parallels each other. The mower may include a seat that can be moved such that operational components (e.g., a mower engine, battery, pump, or steering control) are more accessible.

20 Claims, 6 Drawing Sheets

RIDING MOWER WITH A SUSPENSION COMPONENT COUPLED TO A PLURALITY OF USER SUPPORT COMPONENTS AND METHODS OF MAKING AND USING THEREOF

CROSS-REFERENCE TO RELATED APPLICATIONS

This application claims the benefit of priority to U.S. Provisional Patent Application No. 61/139,554, filed on Dec. 20, 2008, which is hereby incorporated by reference in its entirety.

BACKGROUND

Riding mowers are commonly used to mow large areas of land. The mower includes a seat for the user, typically on top of the mower, such that the user rides on the mower. Controls, such as steering controls, acceleration and braking controls and other cutting-specific controls may be accessible to the user from the provided seat. Professional mowers may frequently use riding mowers, as they can quickly and easily mow large lawns.

However, land to be mowed is often uneven, and mowers may need to cross other uneven terrain (e.g., roads) to move from one land area to another. Objects such as rocks may provide additional surface unevenness. Because the seat is attached to the mower, the user may be subject to uncomfortable, jerky movement as the mower crosses the uneven patches. In addition to immediate discomfort, such rough movements may cause prolonged injury (e.g., back or neck injury) to the user.

SUMMARY

In some embodiments, a mower is provided, the mower comprising a main frame; a plurality of wheels coupled to the main frame; at least one cutter coupled to the main frame; a foot support component coupled to the main frame and configured to at least partly support one or both feet of a user; a seat coupled to the main frame; and a suspension component coupled to the foot support component and to the seat and configured such that the foot support component and the seat are movable with respect to the main frame, wherein the suspension component, the foot support component and the seat are configured such that movement of the foot support component substantially parallels that of the seat. The movement may be movement at least partly or completely controlled by the suspension component. The suspension component, the foot support component and the seat may be configured such that the movement of the foot support component is associated with a vertical and/or angular displacement substantially equal to a corresponding vertical and/or angular displacement of the seat. The mower may further comprise at least one mower controller, wherein the suspension component is coupled to the at least one mower controller and configured such that the at least one mower controller is movable with respect to the frame, and wherein the suspension component, the seat and the at least one mower controller are configured such that movement of the at least one mower controller substantially parallels that of the seat. The at least one mower controller may comprise a steering control. The at least one mower controller may comprise at least one of a wheel and a lever. In some instances, the position of the seat is not controlled by any additional suspension components not coupled to the foot support component. In some instances, the position of the foot support component is not controlled by any additional suspension components not coupled to the seat. The seat may be rigidly connected to the foot support component. The suspension component may be directly connected to the seat but, in some instances, is not to the foot support component. The suspension component may be directly connected to the foot support component but not to the seat. The suspension component may be directly connected to both the seat and the foot support component. The suspension component may be configured to move the foot support component and the seat in a vertical direction, and the seat may be configured to be displaced in a non-vertical direction, the non-vertical direction be orthogonal to the vertical direction and the non-vertical displacement being at least about 6 inches. The mower may further include a pivoting component configured to move the seat in the non-vertical direction. The pivoting component may also move the seat in the vertical direction. The non-vertical displacement may at least about 12 or at least about 24 inches. Displacement of the seat in the non-vertical direction may change the accessibility of mower part, such as an engine, pump, steering control, or tank battery. The foot support may be configured to be displaced in the non-vertical direction. The suspension component may connect one or more of the plurality of wheels to the foot support component. The suspension component may include one or more of a shock absorber, a magnet, an air shock, a hydraulic dampener, a spring, and an air bag. The suspension component may be connected to the main frame. The suspension component may comprise a spring. The suspension component may comprise a load compensation adjuster having a range of compression in which the load compensation adjuster exerts increasing reactive force against compression responsive to increasing compression of the spring. The load compensation adjuster may comprise one or more of an air shock, shock absorber, a magnet, an air shock, a hydraulic dampener, a spring, and an air bag. The suspension component may comprise a plurality of springs. The plurality of wheels may support the main frame, and the at least one cutter for movement over a surface. The foot support component and seat may be configured to move vertically up and down relative to the main frame at least partly based on force exerted by the suspension component. The mower may further comprise a cutter deck coupled to the main frame, wherein the cutter is positioned in the cutter deck.

In some embodiments, a method of compensating for load change in a mower is provided, the method comprising: providing a main frame; providing a plurality of wheels coupled to the main frame; providing a cutter coupled to the main frame; providing a suspension component coupled to the main frame; providing a foot support component coupled to the suspension component and configured to at least partly support one or both feet of a user; and providing a seat coupled to the suspension component; and compressing at least part of the suspension component in a first direction in response to movement of the main frame; exerting forces from the suspension component on the foot support component and on the seat in a second direction in response to the compression, the second direction being substantially opposite to the first direction; and moving the foot support component and the seat in response to the exerted force, the movement of the foot support component substantially paralleling that of the seat. The substantially parallel movement may indicate that a vertical displacement of the foot support component is substantially the same as a vertical displacement of the seat. The method may further comprise providing at least one mower controller coupled to the suspension component and configured such that the at least one mower controller is movable with respect to the frame; exerting a force from the suspension component on the mower controller in the second direction in response to the compression; and moving the mower controller in response to the exerted force, the movement of the mower controller substantially paralleling that of the seat. The at least one mower controller may comprise a steering control and/or at least one of a wheel and a lever. In some instances, the position of the seat is not controlled by any additional suspension components not coupled to the foot support component. In some instances, the position of the foot support component is not controlled by any additional suspension components not coupled to the seat. The method may further comprise displacing the seat in a third direction by a displacement of at least about 6 inches, wherein the second direction is in a vertical direction, and wherein the third direction is in a non-vertical direction orthogonal to the vertical direction. The method may further comprise pivoting the seat in order to displace the seat in the non-vertical direction. The displacement may be at least about 12 inches or at least about 24 inches. Displacement of the seat in the non-vertical direction may change the accessibility of mower part such as an engine, pump, steering control, or tank battery of the mower. The method may further comprise displacing the foot support is in the non-vertical direction. The at least part of the suspension component may comprise one or more of a shock absorber, a magnet, an air shock, a hydraulic dampener, a spring, and an air bag. The at least part of the suspension component may comprise a spring. The method may further comprise limiting compression of the at least part of the suspension component by exerting a reactive force from a load compensation adjuster of the suspension component. The load compensation adjuster may comprise one or more of a shock absorber, a magnet, an air shock, a hydraulic dampener, a spring, and an air bag. The plurality of wheels may support the main frame, and the at least one cutter for movement over a surface. The method may further include moving the foot support and the seat vertically up and down relative to the main frame at least partly based on the force exerted by the suspension component.

In some embodiments, a mower is provided, the mower comprising means for supporting a plurality of mower operational components; means for enabling movement of the mower; means for cutting vegetation; means for supporting a user in a seated position, the seated position-supporting means being coupled to the operational component supporting means; means for at least partly support one or both feet of the user, the feet supporting means being coupled to the operational component supporting means; and means for dampening movement of the feet support means and the user support, means for coupling movement-dampening means, the seated position-supporting means and the feet supporting means such that movement of the seated position-supporting means parallels that of the feet supporting means. The mower may further include means for at least partly controlling the mower, the mower controlling means being coupled to the operational component supporting means and are configured such that movement of the mower controlling means is damped by the movement dampening means, wherein the coupling means further couple the mower controlling means and the seated position-supporting means such that movement of the seated position-supporting means parallels that of the mower controlling means. The mower controlling means may comprise a steering control. The mower controlling means may comprise at least one of a wheel and a lever. The feet-support movement dampening means may be configured such that the foot support means are movable with respect to the operational component supporting means. The operational component supporting means may comprise a main frame. The operational components may comprise an engine. The movement-enabling means may comprise a plurality of wheels. The gas-cutting means may comprise a cutter. The feet-supporting means may comprise a surface. The feet-support movement dampening means may comprise a suspension component. The seated position-supporting means may comprise a seat.

In some embodiments a method of manufacturing a mower is provided, the method comprising: providing a main frame; providing a plurality of wheels coupled to the main frame; providing a cutter coupled to the main frame; disposing a foot support component and a seat with respect to a suspension component, such that the suspension component at least partly damps movement of the foot support component and the seat, the foot support component and the seat each being coupled to the main frame, and the foot support component being configured to at least partly support one or both feet of a user; and coupling the seat to the foot support component such that movement of the foot support component substantially parallels that of the seat. The method may further include disposing at least one mower controller with respect to the suspension component, such that the suspension component at least partly damps movement of the at least one mower controller; and coupling the seat to the at least one mower controller such that movement of the at least one mower controller substantially parallels that of the seat. The at least one mower controller may comprise a steering control. The at least one mower controller may comprise at least one of a wheel and a lever. In some instances, the position of the seat is not controlled by any additional suspension components not coupled to the foot support component. In some instances, the position of the foot support component is not controlled by any additional suspension components not coupled to the seat. The method may further include coupling the seat to a pivoting component, such that the seat is configured to rotate the seat around a point, thereby displacing the seat in a non-vertical direction, the non-vertical displacement being at least 6 inches. The non-vertical displacement may at least about 12 inches or at least about 24 inches. Displacement of the seat in the non-vertical direction may change the accessibility of mower part, such as an engine, steering control, pump, or tank battery of the mower. The method may further comprise coupling the foot support to the pivoting component. The method may further comprise rigidly connecting a seat to the foot support component such that movement of the foot support component parallels that of the seat. The suspension component may comprise a spring. The method may further comprise connecting the spring to the main frame. The suspension component may further comprise a load compensation adjuster having a range of compression in which the load compensation adjuster exerts increasing reactive force against compression responsive to increasing compression of the spring. The load compensation adjuster may comprise one or more of a shock absorber, a magnet, an air shock, a hydraulic dampener, a spring, and an air bag. The suspension component may comprise one or more of a shock absorber, a magnet, an air shock, a hydraulic dampener, a spring, and an air bag. The method may further include connecting the suspension component to the main frame. The suspension component may include a plurality of springs. The plurality of wheels may support the main frame and the at least one cutter for movement over a surface. The foot support component and seat may be configured to move vertically up and down relative to the main frame at least partly based on force exerted by the suspension component.

DETAILED DESCRIPTION

Some embodiments generally relate to apparatuses, systems and methods related to a riding mower including a plurality of user support components coupled to a main frame and a suspension component coupled to the plurality of user support components such that movement of the plurality of user support component parallels each other. The mower may include, for example, a seat that can be moved such that operational components (e.g., a mower engine, pump, steering control, or tank battery) are more accessible.

In some embodiments, a mower is provided that includes a suspension component coupled to a seat of the mower and to one or both of a foot support component and at least one mower controller. The suspension component may be configured such that the foot support component, the mower controller and/or the seat are movable with respect to a main frame of the mower. The suspension component may thus serve to reduce movement of the seat, mower controller and/or foot support as compared to that of the main frame. This may reduce discomfort or injury otherwise incurred due to the unevenness of the surface underlying the mower. In some instances, one, more or all of: the suspension components, the mower controller, the foot support component and the seat are configured such that movement of the foot support component and/or mower controller parallels that of the seat. Thus, the user's legs may move a similar amount as the user's back. This configuration may allow a user to maintain a relatively stable posture despite, for example, unevenness of the surface below. This may further reduce, for example, back strain.

Figure 1:
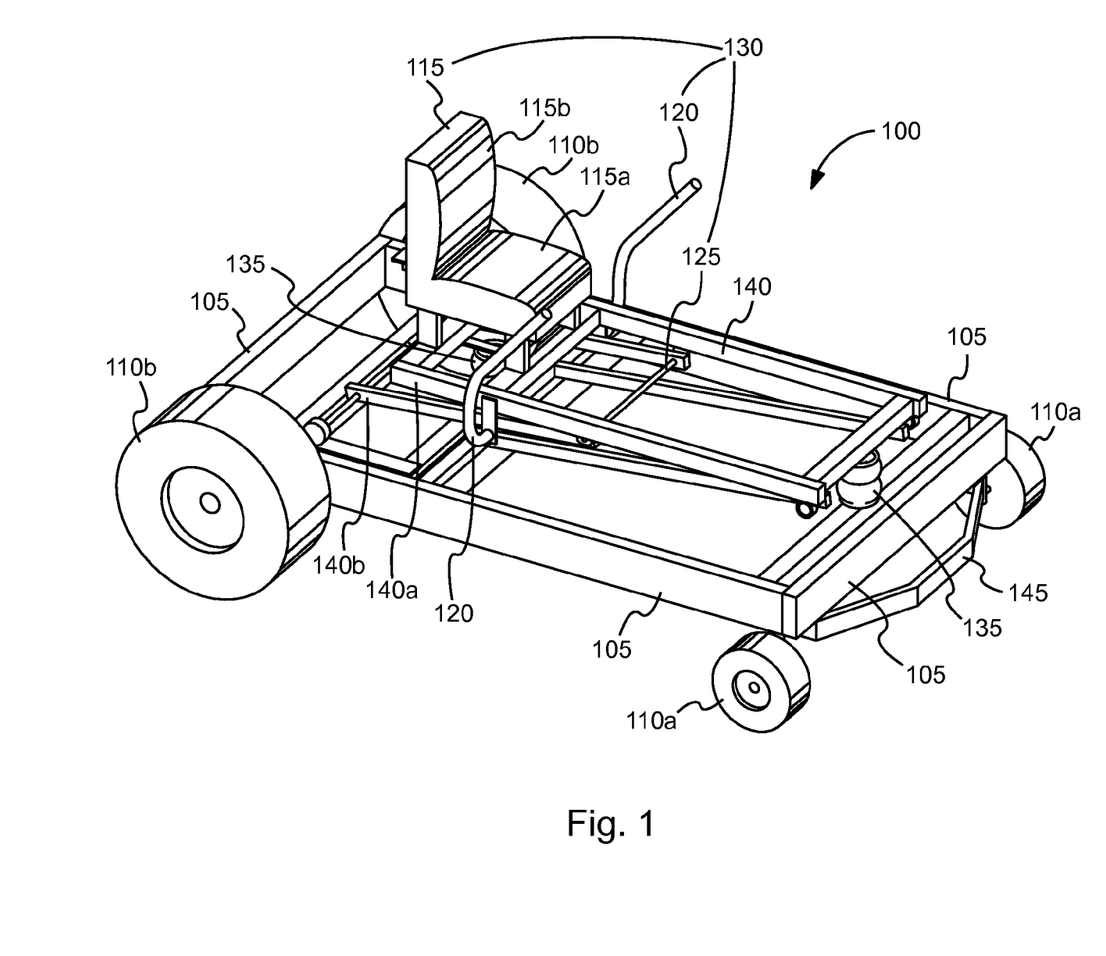
FIG. 1 shows an embodiment of an example of a riding mower that includes a suspension component and a movable frame.

FIG. 1 shows one embodiment of a mower 100 with a foot-support and seat suspension system. The mower 100 may include any riding mower. In some instances, the mower 100 is configured to support a user on top of the mower (e.g., by providing a seat). The mower 100 may be configured to support a user over a main portion of the mower (e.g., as shown in FIG. 1) or to support the user behind or beside a main portion of the mower (e.g., using a sidecar or cart). The mower 100 may include a tractor, such as a lawn tractor.

The mower 100 may be characterized with, for example, a horsepower of at least about, about and/or less than about 1, 2, 3, 5, 7, 10, 15, 20, 25, 30, 50, 100, 200, 300, 500, 1000, 5000, or 10000. The mower 100 may include a transmission. The transmission may include, for example, a manual transmission, a continuously variable transmission, a hydrostatic transmission, a mechanical transmission and/or an electric transmission.

The mower 100 may be configured to expel cut vegetation (e.g., grass) through an opening, for example, in the side or rear of the mower's housing. In some instances, the mower may include a bag or is configured to expel cut grass into a bag.

In some instances, the mower 100 can include a rototiller, snowblower, snowplow, yard vacuum, bucket or fork-lift tine.

The mower 100 may be characterized by a turning radius of less than about, about or more than about 4, 6, 8, 10, 12, 18, 24, 36, 48, or 60 inches.

The mower may include one or more cutters, such as a rotatable cutter. The cutter may be configured to cut vegetation (e.g., grass). The cutter may be housed or positioned in or under a cutter deck 145. The cutter deck 145 may be coupled to the main frame 105. The cutter and/or the cutter deck 145 may be positioned towards or in the front of the mower and/or one or more sides of the mower and/or behind of the mower.

The mower 100 may include a main frame 105. Various components of the mower 100 may be directly and/or indirectly connected to the main frame 105. In one instance, two or more wheels 110 are connected to each other via the main frame 105. The main frame 105 may connect a seat 115 to one or more wheels 110. In the embodiment shown in FIG. 1, a movable frame 140 rests on a portion of the main frame 105. The main frame 105, a and/or the movable frame 140 may include a material including, for example, a metal, steel, aluminum, plastic and/or hard composite plastic. The material may be a substantially rigid. In some embodiments, the main frame 105 and/or the movable frame 140 is substantially rigid and inflexible.

The mower 100 may include a plurality of wheels 110. In some instances, the mower 100 includes at least about, about and/or less than about 1, 2, 3, 4, 6, 8, 10, 12, 18, 24, 36, 40, 48, 64, or 72 wheels 110. The mower 100 may include one, two or more front wheels 110a and/or one, two or more back wheels 110b. In some instances, two or more wheels 110 are of approximately the same size, while in other instances, they differ in size. In one embodiment, as shown in FIG. 1, the one or more back wheels 110b are larger than the one or more front wheels 110a. The back wheels, in some embodiments, are substantially the same size as the front wheels. In some embodiments, the back wheels 110b may be at least about and/or less than about 1.1, 1.2, 1.3, 1.5, 2, 2.5, 3, 5 or 10 times larger than the front wheels 110a. The wheels 110 may include plastic, steel, foam and/or rubber.

The mower 100 may include one or more mower controllers. The mower controllers may include a steering control 120 that at least partly controls the orientation of one, more or all wheels 110. The steering control 120 may include, for example, a wheel, lever or joystick. The mower controllers (including the steering control) may be controllers configured to be operated by a user. The mower controllers may be connected to intermediate controllers that are not configured to be operated by a user during use of the mower. Other mower controllers may include a cutting height control, ground-speed control, parking brake, blade power control.

The mower 100 may include a monitoring devices, such as gauges or warning lights, which are not shown in FIG. 1.

The mower 100 may include a seat 115. The seat 115 may have a first portion 115a that is generally configured to be substantially parallel to the ground underlying the mower 100 when the mower 100 is in use. In some instances, the first portion 115a is flat, while in other instances, the first portion 115a is contoured. In some embodiments, the seat 115 includes a second portion 115b that is positioned substantially perpendicularly to the first portion 115a. In some instances, the second portion 115b may also be configured to fold down onto the first portion 115a (e.g., when the seat 115 is pivoted about a point to allow access to inner mower parts or to allow for seat height adjustment or to allow the user to stand while the mower is in operation). The first and second portions 115a and 115b may be separated by an angle that is less than about, about and/or more than about 40, 60, 70, 80, 85, 90, 95, 100, 110, 120, or 140 degrees. The second portion 115b may be configured to provide support for a user's back. The second portion 115b may be flat or contoured (e.g., with lumbar support). In some embodiments, the seat 115 does not include the second portion 115b. The first portion 115a may be directly connected to the second portion 115b or may be indirectly connected (e.g., through the main frame 105). In some embodiments, the mower includes one or more seat controls. One of the seat controls may at least partly control the angle separating the first and second portions 115a and 115b.

The mower 100 may include a foot support component 125. The foot support component 125 is configured to support one or more feet of the user while the user is seated in the seat 115. In FIG. 1, an embodiment is shown in which the foot support component 125 can include substantially a rod. In some embodiments, the foot support component 125 can include a platform, plate, or a substantially flat surface. In one embodiment, a movable frame 140 can support a plate, platform or substantially flat surface. For example, a plate may be positioned over the rod shown in FIG. 1, between, or on top of the beams of movable frame 140. The foot support component 125 may include indentations, markings, or raised portions to accept the user's feet (e.g., indentations in a large plate). (See, e.g., FIG. 4A.) In one embodiment, the large plate may comprise, be connected to and/or support the foot support component 125 and/or may support other user support components 130 (e.g., seat 115). The foot support component 125 may be directly or indirectly connected to the seat 115. For example, the seat 115 may be supported over a platform that serves as a foot support component 125. The platform may also support one or more mower controls.

User support components 130 may include both the seat 115 and the foot support component 125. User support components 130 may include additional components, such as arm support components, not shown in FIG. 1. In some instances, user support components 130 include one or more mower controllers. This may be appropriate because a user, for example, may rest or support his hand on or around the controller. One or more of the user support components (e.g., seat 115 and the foot support component 125) may be rigidly connected to each other.

The mower 100 may include a suspension component. The suspension component may be coupled to one or more user support components 130. The suspension component may be configured to at least partly suspend one or more of the user support components (e.g., with respect to the main frame 105). The suspension component and one or more user support components 130 may be configured such that the one or more user support components 130 are movable (e.g., with respect to the main frame 105). The suspension component and/or parts of the suspension component may be directly connected to none, one, a plurality or all of the user support components. For example, the suspension component may be directly connected to the seat 115 but not to the foot support component 125, to the foot support component 125 but not to the seat 115, or to both the seat 115 and the foot support component 125. The suspension component may connect one or more of the user support components 130 (e.g., the foot support component 125) to one or more wheels 110 of the mower. In these instances, the suspension component may serve as the only connection between the identified parts or one of a plurality of connections.

The suspension component may be configured to reduce or dampen vibrations (e.g., initiated by mower components such as the engine) or jolts (e.g., due to uneven surfaces or objects on the surface) experienced by one or more user support components 130 or by a user supported by the user support components 130.

The suspension component may be configured to move (e.g., by exerting a force on) one or more user support components in a substantially vertical direction (e.g., with respect to an underlying surface and/or to the main frame). Thus, at least part of the suspension component may be compressed in a first direction in response to movement of the main frame 105, and the suspension component may exert a force on one or more of the user support components in a second direction in response to the compression, the second direction being substantially opposite to the first direction. The compression may be limited by, for example, exerting a reactive force from a load compensation adjuster of the suspension component. The load compensation adjuster may include one or more shock absorbers, magnets, hydraulic dampeners, air shocks, springs, and/or air bags.

The one or more user support components may then move in response to the exerted force.

In some embodiments, the movement of a plurality of user support components parallels each other, such that, for example, a user can maintain a substantially stable posture during the movement. Parallel movement of user support components indicates that movement of one component corresponds to substantially predictable movement of another of the components. In some instances, the components move by substantially the same (absolute or angular) amount and/or in substantially the same direction. One or more of the user support components and/or movable frame 140 may also be movable in a third direction. For example, the movable frame may be configured to move in a horizontal direction, such that it moves towards a side, a front, or a back of the mower.

Whereas in some cases the movement of a plurality of user support components always parallels each other, in others, the movement is paralleled only for specific types of movement. For example, the movement may be paralleled only for movement during operation of the mower, while the suspension component is operating, while movement is being damped, or while user-operated controls changing the positions of the support components are not being operated. In some instances, the movement refers to instances where the suspension component is at least partly or completely controlling the movement.

In some embodiments, only one suspension component controls the position of the two or more user support components (e.g., two or more of the foot support component 125, the seat 115 and a mower controller). In some embodiments, at least one of the user support components (e.g., the seat 115, the foot support component 125 and/or the mower controller) is not controlled by any additional suspension components not coupled to another of the user support components.

As shown in FIG. 1, the suspension component may include one or more air bags 135. The suspension component may include one or a plurality of springs. The suspension component may include a shock absorber. The suspension component may include a magnet and/or a hydraulic dampener. A part of the suspension component may be connected to the main frame 105. The suspension component may include a load compensation adjuster having a range of compression in which the load compensation adjuster exerts increasing reactive force against compression responsive to increasing compression of the spring. The load compensation adjuster may include, for example, a shock absorber, an air shock, a spring, a plurality of springs, magnets, hydraulic dampeners and/or an air bag.

In some instances, a part of the suspension component may be positioned both near the front and near the back of the mower. For example, as shown in FIG. 1, the air bags are positioned both near the front and near the back of the mower. Suspension component parts may also be positioned near each tire. In still other conditions, the suspension component parts are positioned only near (e.g., under) the seat or near the center of a movable frame 140.

Figure 2:
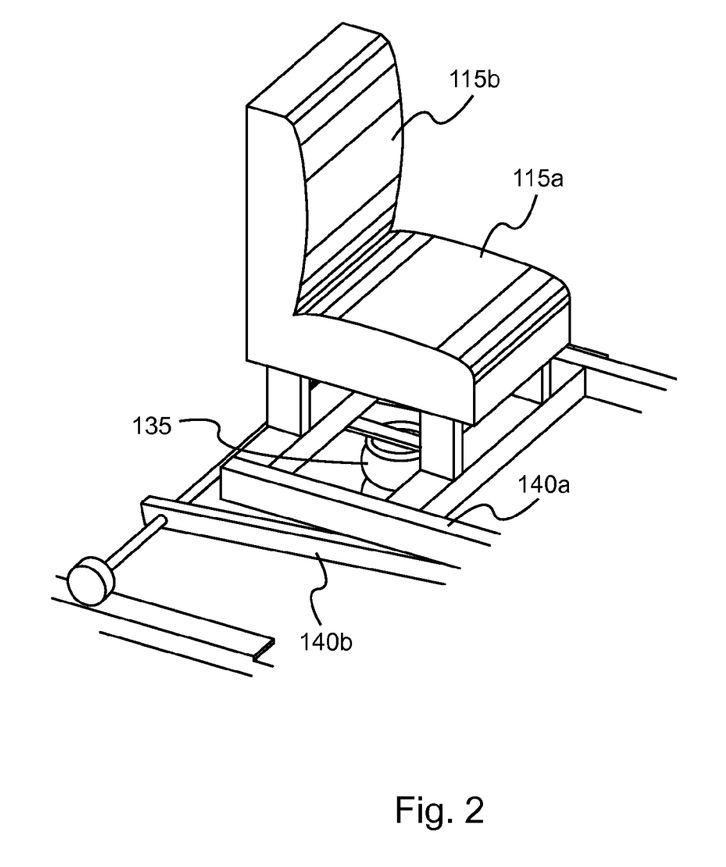
FIG. 2 shows a portion of an embodiment of an illustrative riding mower suspension system towards the back of the mower.

FIG. 2 shows an expanded view around the seat 115 of the mower. The seat 115 may be connected to a suspendable portion 140a of the movable frame 140. The suspendable portion 140a may be configured to move with respect to a non-suspendable portion 140b of the movable frame 140, which may, for example may be connected to (e.g., by resting on) the main frame 105. In some embodiments, the suspendable portion 140a is configured to move with respect to the main frame 105.

One or more parts of the suspension component and/or movable frame 140 may be configured such that a suspendable portion 140a of the movable frame is configured to move with respect to the non-suspendable portion 140b. FIG. 2 shows an embodiment where two air bags 135 (though the number of air bags and/or the type of suspension component part may be any other appropriate number of parts) support the suspendable portion 140a over the non-suspendable portion 140b. Upon application of a force, the air bags 135 may compress such that the distance separating the suspendable portion 140a and non-suspendable portion 140b changes (e.g., decreases) as compared to when the force is not applied. One or more suspension component parts may support the suspendable portion 140a over the non-suspendable portion 140b or over the main frame at any appropriate position. For example, though in this embodiment, air bags 135 are positioned under the seat 115 and towards the front of the mower, they could be positioned under the foot support component 125, off to the side of the seat or at corners of the suspendable portion 140a. In some embodiments, movable frame 140 does not include a non-suspendable portion 140b. Thus, one or more parts of the suspension component may be configured such that the suspendable portion 140a can move relative to the main frame 105. In some embodiments, movable frame 140 dampens movements induced by uneven ground beneath the mower 100 (e.g., by being connected to a suspension component), in other embodiments, it does not.

In some embodiments, the suspension component and a plurality of user support components 130 (e.g., the seat 115 and the foot support component 125) are configured such that the movement of a plurality of user support components 130 parallels each other. This may enable a user to maintain a substantially stable position or posture while the suspension component 135 acts to damp or reduce movements or vibrations. In some instances, the paralleled movement is such that the distance between the first portion 115a of the seat and the foot support component 125, the distance between the first portion 115a of the seat 115 and one or more mower controllers, and/or the distance between the foot support component 125 and one or more mower controllers is substantially constant or changes by less than about 25%, 20%, 15%, 10%, 5%, 3%, 1% or 0.5% while the suspension component 135 is actively dampening or reducing movements or vibrations typically experienced while mowing large lawns or fields. This may be accomplished, for example, by attaching the mower controllers, seat and/or foot support component 125 to a single platform (which in some instances may serve as the foot support component 125).

In some instances, the first portion 115a of the seat and a surface of foot support component 125 configured to accept a user's foot (e.g., the top surface of a platform foot support component) may each be oriented at an angle with respect to a part of the main frame. Differences in the orientation of the first portion 115a and the orientation of the foot support component 125 may be characterized by an angle θ. In some instances, the first portion 115a and the foot support component 125 are substantially parallel to each other (θ=0), while in others they are non-parallel (θ≠0). The suspension component 135 may be configured such the changes in the angle θ are reduced or such that the angle θ remains substantially constant while the suspension component 135 is actively dampening or reducing movements or vibrations.

One or more user support components 130 (e.g., seat 115, foot support component 125 and/or at least one mower controller) may be attached to a movable frame 140. The movable frame 140 may be connected to at least part of the suspension component. For example, in FIG. 1, the movable frame 140 is supported by a plurality of air bags 135. Thus, the suspension component can at least partly control the movement of the movable frame 140, which at least partly controls the movement of the one or more user support components. This can allow the movement of a plurality of the user support components 130 to experience substantially paralleled movement. In some instances, such as in the embodiment shown in FIG. 4A, each of the plurality of user support components is moved by a substantially equal translational distance. In others, each of the plurality of user support components is moved by a substantially equal angular distance.

Figure 3:
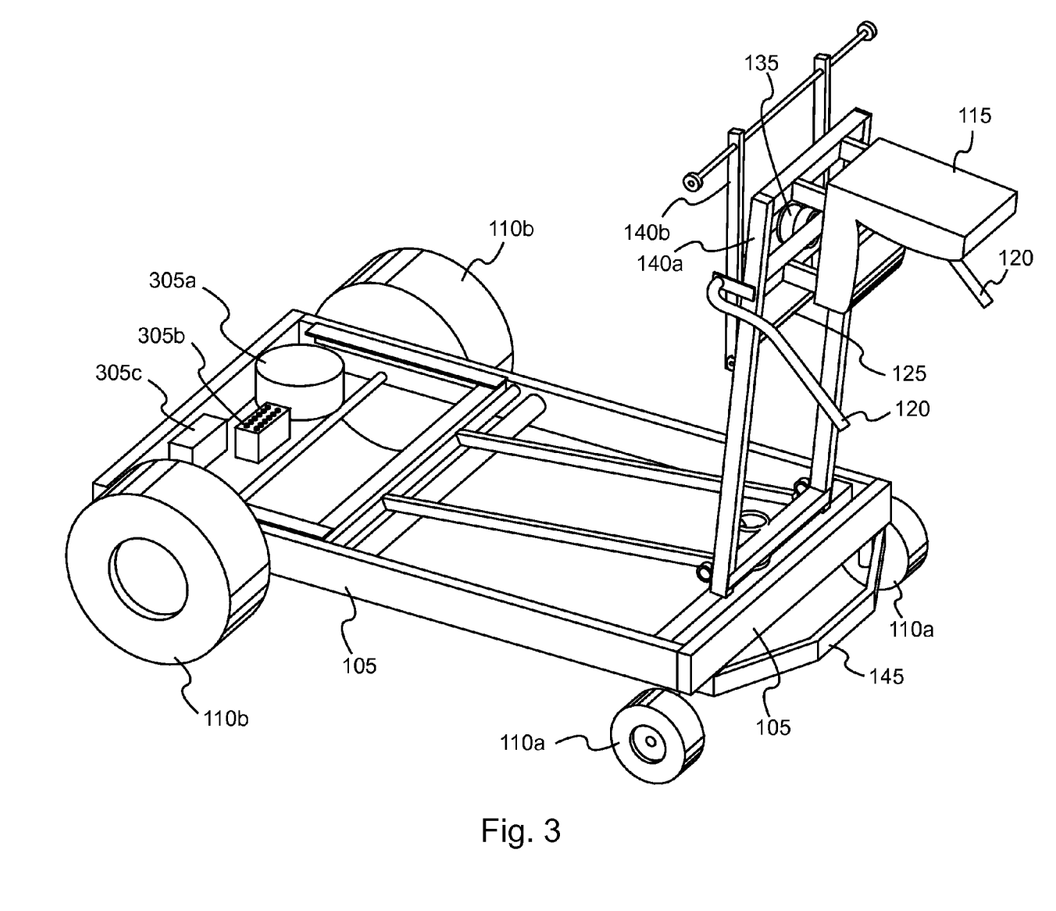
FIG. 3 shows an embodiment of an example of a riding mower wherein the movable frame is rotated to a rotated position.

FIG. 3 shows an embodiment in which the movable frame 140 is positioned in a rotated position. The movable frame 140 may be pivoted at a pivot point or pivot line (e.g., towards or at the front of the mower). For example, a pivoting component may be configured to move one or more user support components and/or the movable frame 140 in a non-vertical direction and/or in a vertical direction, the non-vertical direction being orthogonal to a vertical direction. In some embodiments, a frame (e.g., main frame 105 or movable frame 140) comprises the pivoting component, while in other embodiments, it does not. The non-vertical direction may be at least about, about and/or less than about 3, 6, 12, 24, 36, 48, 60, 90 or 120 inches. The vertical direction may be, for example, a direction along which the suspension component is configured to move one or more user support components. Thus, the movable frame and/or another user support component may be configured to be displaced in a non-vertical direction.

This rotation may be in a direction to change the angle of the movable frame 140 with respect to the ground. The movable frame 140 may be configured to rotate at least about, about and/or less than about 0, 5, 10, 20, 30, 45, 60, 70, 80, 90, 100, 120, 140, 160 or 180 degrees. In some embodiments, the movable frame 140 may move from being substantially parallel to the ground to being substantially perpendicular to the ground. Both the suspendable portion 140a and the non-suspendable portion 140b may be rotated or, in some embodiments (e.g., when there is no non-suspendable portion 140b), only the suspendable portion 140a is rotated. Additional components and/or components connected to the movable frame 140 (e.g., the seat 115, the foot support component 125 and/or the mower controller 120) may also be rotated with the movable frame 140, as shown in FIG. 3.

In some embodiments, the rotation of the movable frame 140 allows access to underlying mower parts 305, such that the parts 305 are easier to access when the movable frame 140 is in a rotated position (as shown, for example, in FIG. 3) as compared to when it is in a non-rotated position (as shown, for example, in FIG. 1). The mower parts 305 may include, for example, an engine 305a, a battery 305b, an intermediate steering controller 305c, or a pump. In some embodiments, the mower parts 305 are easier to access because a user support component such as the seat 115 is not positioned over the mower parts (e.g., because the seat has been displaced in the non-vertical direction).

In some embodiments, none, one, more than one or all of the suspension parts (e.g., the air bags 135) are configured to rotate with the movable frame 140. For example, a suspension part, such as the air bags 135 may be connected to a main frame 105 of the mower and the movable frame 140 may rest on the suspension part, such that compression between the main frame and the movable frame 140 at least partly causes the compression. In some embodiments, the mower does not include a movable frame 140. In such instances, user support components 130 may still be suspended with respect to the main frame 105 in order to, e.g., damp uneven-ground induced movements.

In some embodiments, the mower does not include a suspension component but does include a movable frame. In one such instance, a seat 115 and/or other components, such as the foot support component 125 or mower controllers may be attached to a movable frame, but the frame is not connected to and is not configured to contact a suspension part.

Figure 4A:
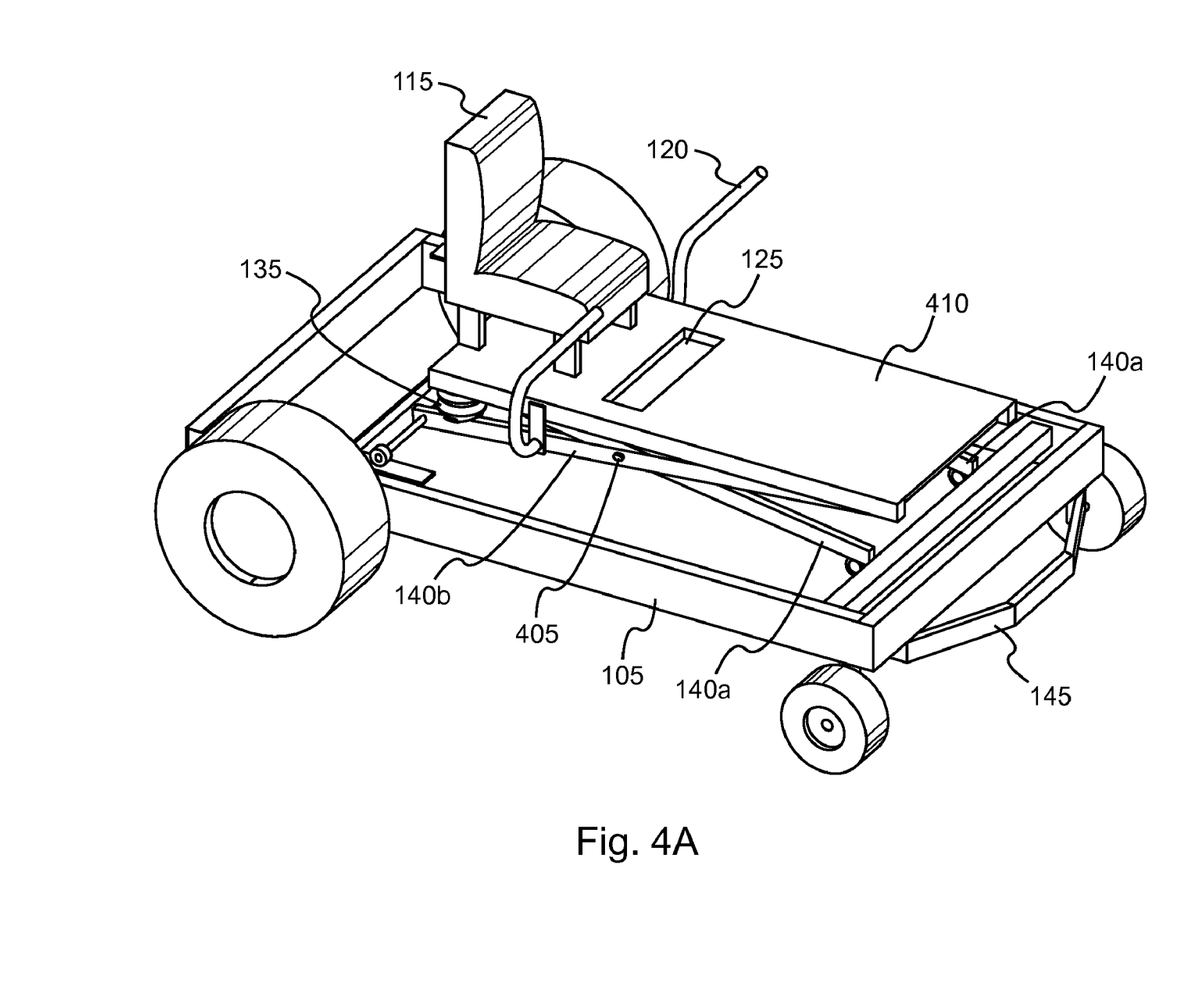
FIGS. 4A-4B shows an embodiment of an example of a riding mower that includes a suspension component and a movable frame.

FIG. 4A shows another embodiment of a mower including a movable frame and a suspension component. Here, the movable frame 140 includes beams 140a and 140b, which intersect at an intersection point 405. Thus, when air bag 135 is compressed, user support components and/or mower controllers may move by substantially equal amounts. This may inhibit dampening-induced changes in the orientation of the user support components and/or the user relative to the ground and/or main frame 105. For example, a platform 410 may be connected to (e.g., supported by) both beams, such that the platform's orientation depends on the beams' positions. All or part of platform 410 may serve as a foot support component 125. The platform may include concaved portions, indentations, markings, or raised portions to accept the user's feet. Intersecting beams configured as shown in FIG. 4A may result in front and back portions of platform 410 moving by substantially equal distances upon dampening. If platform 410 supports a mower controller, supports a user support component 130, and/or acts as user support components 130, similar vertical potion by the beams may allow the user support component and/or the mower controller to move a substantially vertical direction. In some embodiments, user support components are connected to both beams but without use of a platform 410.

While FIG. 4A shows that intersecting beams 140a and 140b can be used to inhibit dampening-induced rotation and/or dampening-induced non-vertical movement, other configurations could also be used. For example, different numbers of intersecting beams could be used, or intersecting surfaces may be used in place of the beams. For example, one or more suspension components could be positioned towards the front of the mower and one or more towards the back. Further, by adjusting spring constants of the components, the motion may be inhibited. In one instance, a suspension component may be positioned towards a center of mass (e.g., of the movable frame 140 or suspendable portion 140a of the movable frame 140).

Thus, in some embodiments, the movable frame 140, suspension parts, and/or the user support components 130 may be configured such that the angular difference between the orientation of one or more user support components 130 and the main frame 105 or ground remains substantially unchanged while the suspension parts are operating (e.g., air bags 135 are compressed). In some instances the angular difference changes by less than about 30, 20, 10, or 5 degrees.

Figure 4B:
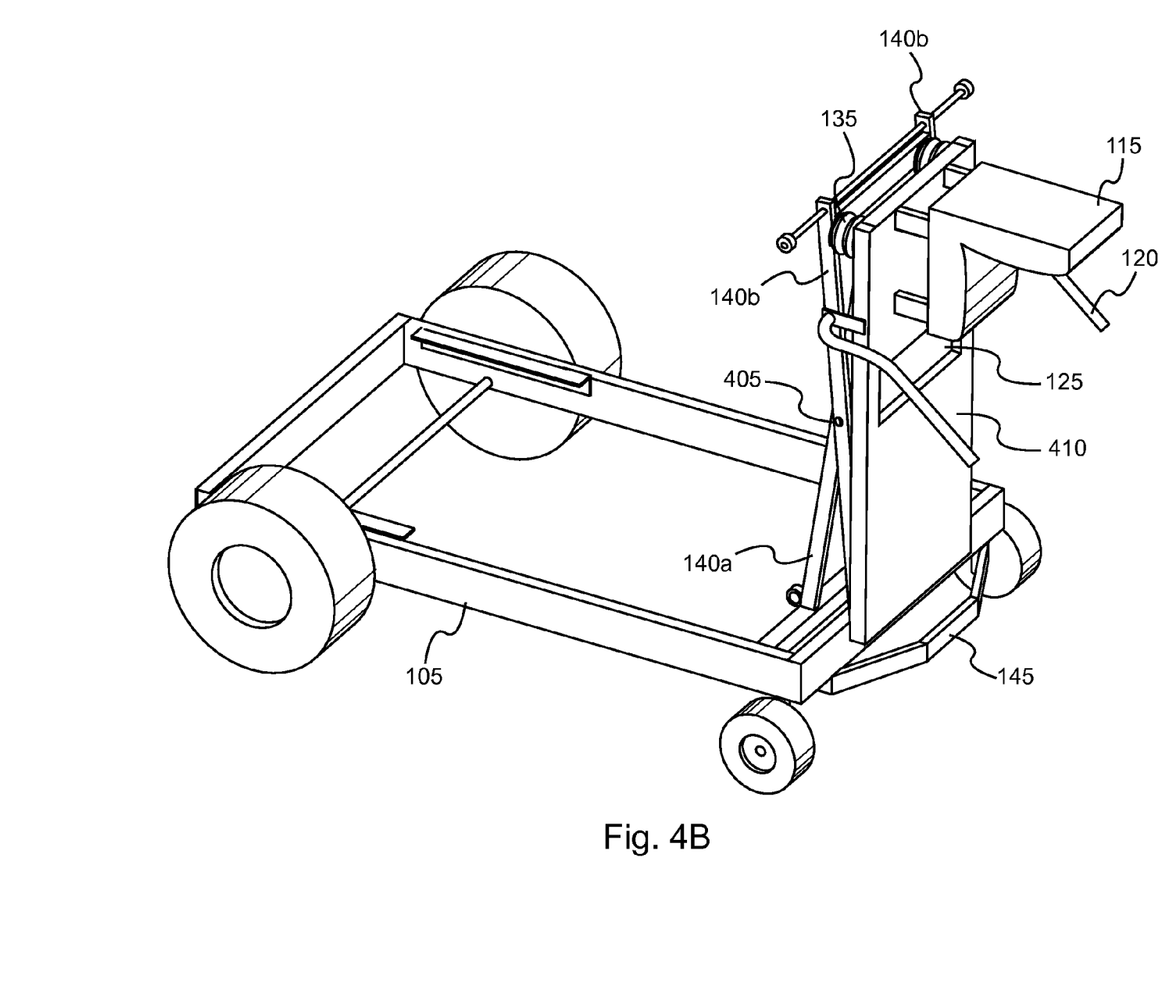

FIG. 4B shows the mower when the movable frame 140 has been moved to a rotated position. Thus, in this embodiment, the parts of the mower that inhibit changes in the user's orientation during dampening are on the moveable frame 140. In other embodiments, some or all of such parts are not. For example, a suspension component could be supported by and/or connected to main frame 105. Additionally, while FIG. 4 shows an embodiment where suspension components are only located towards the back of the mower, one or more additional or alternative suspension components may be positioned closer towards the front (e.g., between intersecting beam 140a and platform 410).

Figure 5:
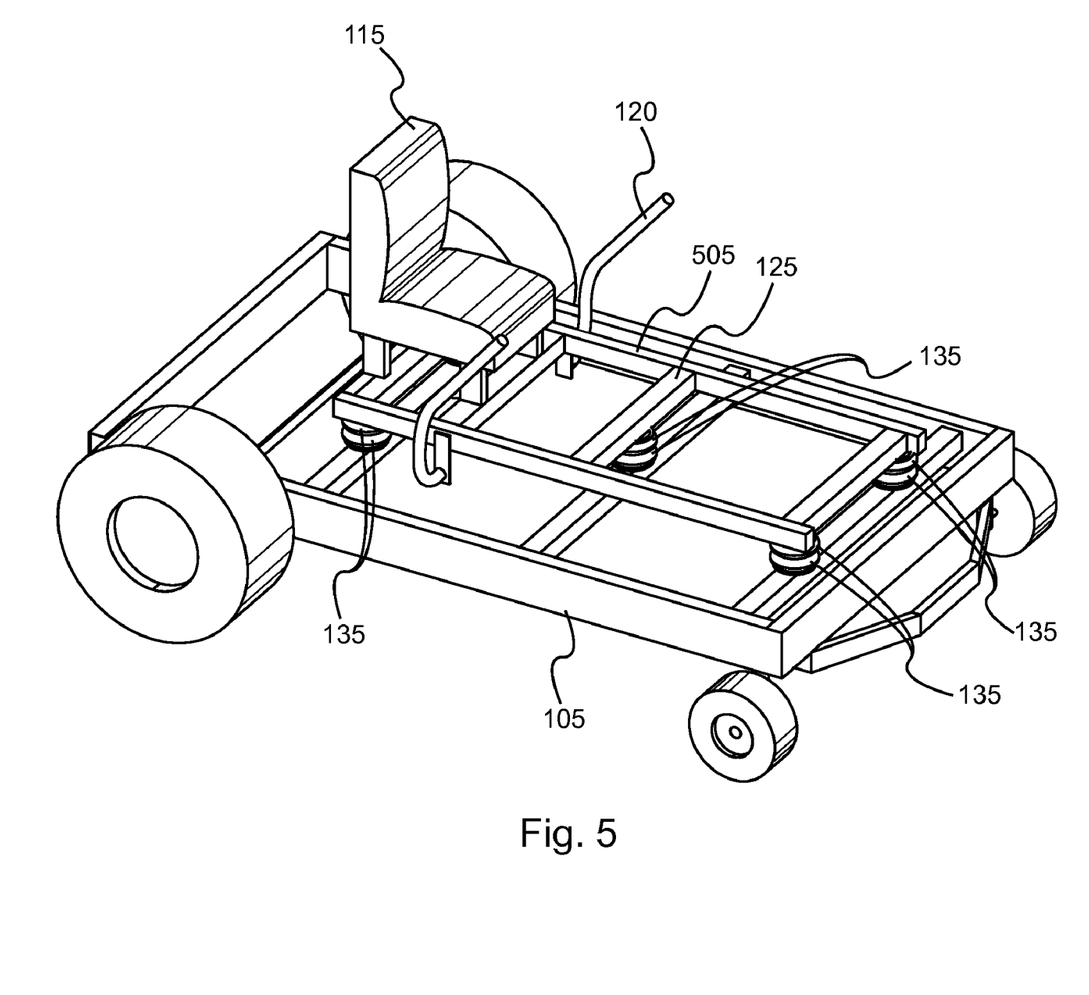
FIG. 5 shows an embodiment of an example of a mower that includes user support components attached to a suspension component.

FIG. 5 shows an embodiment in which the mower does not include a movable frame but does include a suspension component. One or more user support components (e.g., seat 115, motor controller 120 and/or foot support component 125) may be connected to a suspension frame 505, which is suspended (e.g., by one or more suspension parts, such as air bags 135) over the main frame 105. In one embodiment, the suspension frame may be connected to a platform, plate, or a substantially flat surface. The platform, plate or substantially flat surface may comprise, support, and/or be connected to foot support component 125 and/or may support other user support components (e.g., seat 115 and motor controller 120). The suspension frame 505 may be configured such that the supported components (e.g., the seat 115, motor controller and/or foot support component 125) move in a parallel manner. For example, all of the supported components may be attached to a single suspension frame 505. This may allow a user to maintain a substantially stable posture despite dampening resulting from the mower crossing uneven ground.

In at least some of the aforesaid embodiments, any element used in an embodiment can interchangeably be used in another embodiment unless such a replacement is not feasible. It will be appreciated that the steps of the methods described above can be combined, divided, or omitted or that additional steps can be added. It will also be appreciated by those skilled in the art that various other omissions, additions and modifications may be made to the methods and structures described above without departing from the scope of the embodiments.

For purposes of this disclosure, certain aspects, advantages, and novel features of the embodiments are described herein. It is to be understood that not necessarily all such advantages may be achieved in accordance with any particular embodiment. Thus, for example, those skilled in the art will recognize that some embodiments may be embodied or carried out in a manner that achieves one advantage or group of advantages as taught herein without necessarily achieving other advantages as may be taught or suggested herein.

The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim 1ncludes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A mower comprising:
   a main frame;
   a plurality of wheels coupled to the main frame, the plurality of wheels comprising at least one front wheel and at least one back wheel;
   at least one cutter coupled to the main frame;
   a mower controller;
   a foot support component coupled to the main frame and configured to at least partly support one or both feet of a user;
   a seat coupled to the main frame; and
   a suspension component coupled to the mower controller, the foot support component and to the seat and configured such that the mower controller, the foot support component and the seat are movable with respect to the main frame,
   wherein the suspension component, the foot support component and the seat are configured such that a movement of the foot support component at least partly controlled by the suspension component substantially parallels that of the seat,
   wherein the suspension component, the seat and the mower controller are configured such that movement of the at least one mower controller substantially parallels that of the seat, and
   wherein the foot support is closer to the at least one front wheel than is the seat.

2. The mower of claim 1, wherein the suspension component, the foot support component and the seat are configured such that the movement of the foot support component is associated with a vertical displacement substantially equal to a corresponding vertical displacement of the seat.

3. The mower of claim 1, wherein the suspension component, the foot support component and the seat are configured such that the movement of the foot support component is associated with an angular displacement substantially equal to a corresponding vertical displacement of the seat.

4. The mower of claim 1, wherein the seat is rigidly connected to the foot support component.

5. The mower of claim 1, wherein the suspension component is configured to move the foot support component and the seat in a vertical direction, and wherein the seat is configured to be displaced in a non-vertical direction, the non-vertical direction being orthogonal to the vertical direction and the non-vertical displacement being at least about 6 inches.

6. The mower of claim 5, further comprising a pivoting component configured to move the seat in the non-vertical direction.

7. The mower of claim 6, wherein the pivoting component also moves the seat in the vertical direction.

8. The mower of claim 5, wherein displacement of the seat in the non-vertical direction changes the accessibility of an engine of the mower.

9. The mower of claim 1, wherein the suspension component comprises one or more of a shock absorber, a magnet, an air shock, a hydraulic dampener, a spring, and an air bag.

10. The mower of claim 1, wherein the foot support component and seat are configured to move vertically up and down relative to the main frame at least partly based on force exerted by the suspension component.

11. A method of compensating for load change in a mower, the method comprising:
providing a main frame;
providing a plurality of wheels coupled to the main frame, the plurality of wheels comprising at least one front wheel and at least one back wheel;
providing a cutter coupled to the main frame;
providing a suspension component coupled to the main frame;
providing a mower controller coupled to the suspension component and configured such that the mower controller is movable with respect to the frame;
providing a foot support component coupled to the suspension component and configured to at least partly support one or both feet of a user; and
providing a seat coupled to the suspension component, wherein the foot support is closer to the at least one front wheel than is the seat; and
compressing at least part of the suspension component in a first direction in response to movement of the main frame;
exerting one or more forces from the suspension component on the mower controller, the foot support component and on the seat in a second direction in response to the compression, the second direction being substantially opposite to the first direction; and
moving the mower controller, the foot support component and the seat in response to the exerted force, the movement of the foot support component substantially paralleling that of the seat, and the movement of the mower controller substantially paralleling that of the seat.

12. The method of claim 11, wherein the substantially parallel movement indicates that a vertical displacement of the foot support component is substantially the same as a vertical displacement of the seat.

13. The method of claim 11, further comprising displacing the seat in a third direction by a displacement of at least about 6 inches,
wherein the second direction is in a vertical direction, and
wherein the third direction is in a non-vertical direction orthogonal to the vertical direction.

14. The method of claim 13, further comprising pivoting the seat in order to displace the seat in the non-vertical direction.

15. The method of claim 13, wherein displacement of the seat in the non-vertical direction changes the accessibility of an engine of the mower.

16. The method of claim 11, wherein the at least part of the suspension component comprises one or more of a shock absorber, a magnet, an air shock, a hydraulic dampener, a spring, and an air bag.

17. The method of claim 11, further comprising moving the foot support and the seat vertically up and down relative to the main frame at least partly based on the force exerted by the suspension component.

18. A mower comprising:
means for supporting a plurality of mower operational components;
a plurality of wheels, the plurality of wheels comprising at least one front wheel and at least one back wheel;
means for cutting vegetation;
means for controlling at least one of the plurality of mower operational components;
means for supporting a user in a seated position, the seated position-supporting means being coupled to the means for supporting the plurality of mower operational components;
means for at least partly support one or both feet of the user, the feet supporting means being coupled to the means for supporting the plurality of mower operational components, wherein the means for at least partly support one or both feet of the user is closer to the at least one front wheel than is the means for supporting the user in the seated position; and
means for dampening movement of the feet support means and the user support,
means for coupling the movement-dampening means, the controlling means, the seated position-supporting means and the feet supporting means such that movement of the seated position-supporting means and movement of the controlling means parallels that of the feet supporting means.

19. The mower of claim 1, wherein the mower controller comprises a steering control that at least partly controls the orientation of one or more of the plurality of wheels.

20. The method of claim 11, wherein the mower controller comprises a lever.

* * * * *